(12) United States Patent
Schmidt et al.

(10) Patent No.: US 10,994,253 B2
(45) Date of Patent: May 4, 2021

(54) DEVICE FOR EXPELLING DROPS OF A FLOWABLE PRODUCT, AND METHOD FOR OPERATING ONE SUCH DEVICE

(71) Applicant: IPCO GERMANY GMBH, Fellbach (DE)

(72) Inventors: Bernd Schmidt, Wendlingen (DE); Sviatoslav Piddubnyi, Stuttgart (DE); Dietmar Häfele, Weissach im Tal (DE)

(73) Assignee: IPCO GERMANY GMBH, Fellbach (DE)

( * ) Notice: Subject to any disclaimer, the term of this patent is extended or adjusted under 35 U.S.C. 154(b) by 193 days.

(21) Appl. No.: 16/346,685

(22) PCT Filed: Sep. 15, 2017

(86) PCT No.: PCT/EP2017/073250
§ 371 (c)(1),
(2) Date: May 1, 2019

(87) PCT Pub. No.: WO2018/082838
PCT Pub. Date: May 11, 2018

(65) Prior Publication Data
US 2019/0308151 A1 Oct. 10, 2019

(30) Foreign Application Priority Data
Nov. 2, 2016 (DE) ...................... 10 2016 221 501.9

(51) Int. Cl.
*B01J 2/02* (2006.01)
*B01J 2/26* (2006.01)

(52) U.S. Cl.
CPC .. *B01J 2/02* (2013.01); *B01J 2/26* (2013.01)

(58) Field of Classification Search
CPC ...................................... B01J 2/02; B01J 2/26
See application file for complete search history.

(56) References Cited

U.S. PATENT DOCUMENTS

| | | | |
|---|---|---|---|
| 4,610,615 | A | 9/1986 | Froeschke |
| 2010/0242556 | A1 | 9/2010 | Smith |

FOREIGN PATENT DOCUMENTS

| | | | |
|---|---|---|---|
| DE | 2853054 A1 | 6/1980 | |
| DE | 2941802 A1 | 4/1981 | |
| DE | 3421625 A1 | 12/1985 | |

(Continued)

OTHER PUBLICATIONS

International Search Report issued in International Application No. PCT/EP2017/073250 with English translation, dated Dec. 21, 2017 (8 pages).

(Continued)

*Primary Examiner* — Robert J Grun
(74) *Attorney, Agent, or Firm* — Flynn Thiel, P.C.

(57) ABSTRACT

An apparatus for dropletizing a flowable product, having an outer tube which is arranged in a rotatable manner on a core, wherein, in the core, a feed device for the product to be dropletized and a distribution apparatus bearing against the inner circumference of the outer tube are provided. A device for cleaning an outer circumference of the outer tube is provided, wherein the device has a cleaning spatula, a guide rail for the cleaning spatula, which guide rail extends parallel to a central longitudinal axis of the outer tube, and a first drive for moving the cleaning spatula along the guide rail.

17 Claims, 3 Drawing Sheets

(56) References Cited

FOREIGN PATENT DOCUMENTS

Figure 1:
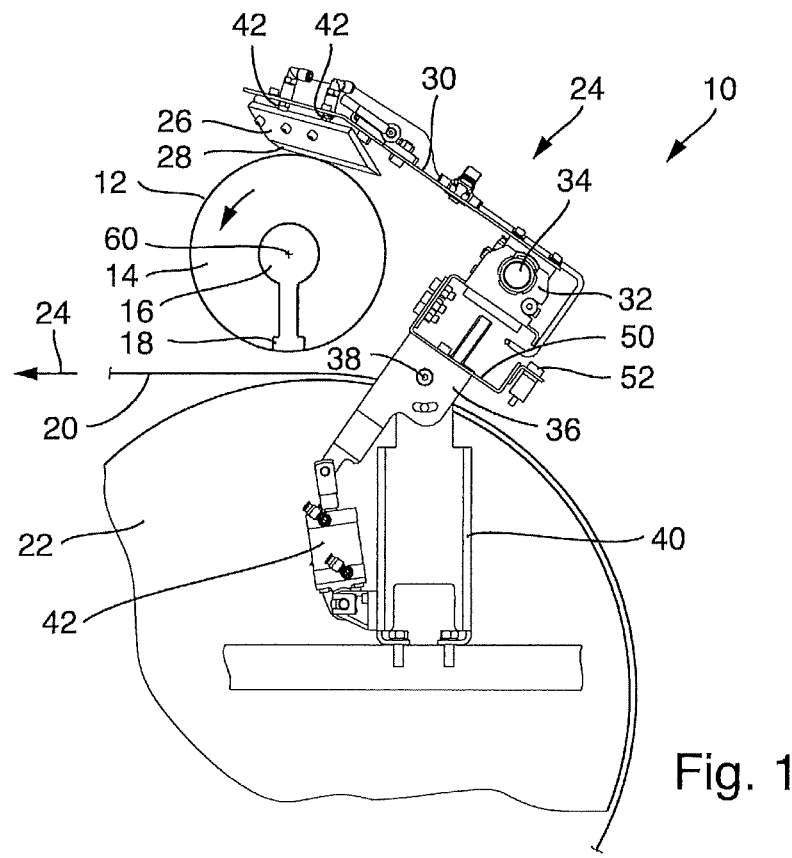

DE      102007007310 A1    8/2008
EP           0166200 A1    1/1986
WO           9112075 A1    8/1991

OTHER PUBLICATIONS

Written Opinion of International Searching Authority issued in International Application No. PCT/EP2017/073250 dated Dec. 21, 2017 (5 pages).
Office Action of German Patent Office issued in German Application No. 10 2016 221 501.9 dated Jun. 16, 2017 (5 pages).

DEVICE FOR EXPELLING DROPS OF A FLOWABLE PRODUCT, AND METHOD FOR OPERATING ONE SUCH DEVICE

The invention relates to an apparatus for dropletizing a flowable product, having an outer tube which is arranged in a rotatable manner on a core and which is provided with multiple passage openings, wherein, in the core, a feed device for the product to be dropletized and a distribution apparatus bearing against the inner circumference of the outer tube are provided. The invention also relates to a method for operating such an apparatus.

With the invention, it is intended to specify an improved apparatus for dropletizing a flowable product and an improved method for operating such an apparatus.

According to the invention, an apparatus having the features of claim 1 and a method having the features of claim 13 are provided for this purpose. Advantageous refinements of the invention are specified in the dependent claims.

Provided in an apparatus according to the invention for dropletizing a flowable product, having an outer tube which is arranged in a rotatable manner on a core and which is provided with multiple passage openings, wherein, in the core, a feed device for the product to be dropletized and a distribution apparatus bearing against the inner circumference of the outer tube are provided, is a device for cleaning an outer circumference of the outer tube, wherein the device has a cleaning spatula, a guide rail for the cleaning spatula, which guide rail extends parallel to a central longitudinal axis of the outer tube, and first drive means for moving the cleaning spatula along the guide rail.

According to the invention, it is proposed that the outer circumference of the outer tube be cleaned with a cleaning spatula, which is moved parallel to a central longitudinal axis of the outer tube. By means of a cleaning spatula, it is possible to realize thorough, quick cleaning, which at the same time is gentle for the material of the outer drum. For example, the outer drum may be provided with a coating to prevent the adhesion of the product to be dropletized. Such a coating is necessarily subjected to wear. Through the provision according to the invention of a cleaning spatula which is moved parallel to the central longitudinal axis of the outer tube, low mechanical loading of the surface of the outer tube is accomplished and, nevertheless, good cleaning action is achieved. Specifically, it is possible by way of the cleaning spatula for product residues adhering to the outer circumference to be lifted off and removed, instead of, for example by means of a take-off lip, for the product residues to be merely distributed over a large area on the outer circumference. The cleaning spatula may be arranged such that the product residues lifted off from the outer tube fall directly onto a steel belt running through beneath the outer tube.

In one refinement of the invention, second drive means for placing the cleaning spatula onto the outer circumference, and for lifting the cleaning spatula off from the outer circumference, of the outer tube are provided.

In this way, a cleaning operation can be set, and the cleaning spatula can be lifted off from the outer circumference outside of the cleaning operation. Consequently, not only is it possible to set a cleaning operation only from time to time, but also mechanical loading of the surface of the outer drum and also mechanical loading of the cleaning spatula are considerably reduced too.

In one refinement of the invention, the cleaning spatula is arranged such that, in the state of placement on the outer circumference, on a side which is situated at the front in the direction of movement of the cleaning spatula, a surface of the cleaning spatula which adjoins a front edge of the cleaning spatula and the outer circumference of the outer tube include an angle of greater than 90°, in particular greater than 135°.

Such an arrangement of the cleaning spatula makes it possible for lifting-off of the impurities by the cleaning spatula to be achieved. Provision may be made for example, with a reverse movement of the cleaning spatula, for this either to be lifted off from the outer circumference, or to be folded over in order then to obtain the same angular relationships again in the opposite direction of movement.

In one refinement of the invention, the cleaning spatula is arranged such that, in the state of placement on the outer circumference and when the outer tube rotates during cleaning operation, the front edge of the cleaning spatula is arranged obliquely with respect to the direction of movement of the outer tube in the contact region between the cleaning spatula and the outer circumference of the outer tube, and that a portion of the front edge which is situated in front of the center of the contact region in the direction of movement of the cleaning spatula includes with the direction of movement of the outer tube a smaller angle than a portion of the front edge which is situated behind the center of the contact region in the direction of movement.

Such an oblique arrangement results in the lifting-off of product residues by means of the cleaning spatula being promoted, because it is specifically the case that the cleaning spatula is arranged obliquely against the direction of movement of the outer circumference. An oblique arrangement of the scraper in this manner also prevents the scraper from being drawn along by the rotating outer tube, and, for example, it can also be achieved that the lifted-off product residues fall directly onto the steel belt.

In one refinement of the invention, the cleaning spatula is formed from a rubber-elastic material, in particular from polyester urethane rubber.

A rubber-elastic material has turned out to be highly advantageous in the realization of the invention. Firstly, product residues can be reliably lifted off from the outer circumference of the outer tube by means of the cleaning spatula composed of rubber-elastic material. At the same time, mechanical loading of the surface of the outer circumference is kept low. Polyester urethane rubber, which is available for example under the product name "Vulkollan", is particularly suitable.

In one refinement of the invention, at least one spray nozzle for spraying the outer circumference of the outer tube with a cleaning liquid is provided.

In this way, it is possible for any dried-on product residues to be softened such that they can be reliably removed. For example, provision may also be made for the product residues to be liquefied to a certain extent by means of the cleaning liquid and then to be taken off by the cleaning spatula. Advantageously, use is made of water as a cleaning liquid.

In one refinement of the invention, the at least one spray nozzle is arranged in the region of the cleaning spatula and is moved together with the cleaning spatula.

In this way, the cleaning liquid can be applied in a targeted manner to those places where the cleaning spatula makes contact with the outer circumference of the outer tube.

In one refinement of the invention, the first drive means have a pneumatic linear drive.

By means of a pneumatic linear drive, it is possible for the desired movement of the cleaning spatula to be achieved even in explosion-protected environments.

In one refinement of the invention, the second drive means have at least one pneumatic cylinder.

A pneumatic drive is also advantageously used for the lifting-off and placement of the cleaning spatula from/back onto the outer circumference of the outer tube. Consequently, it is possible for the apparatus according to the invention to be used even in explosion-protected devices and, for example, both the linear drive and the pneumatic cylinder for lifting off and placing back the cleaning spatula may be arranged below a protective hood of the apparatus.

In one refinement of the invention, position sensors are provided on the guide rail for detecting at least end positions of the cleaning spatula.

In one refinement of the invention, a pneumatic-electronic control unit for controlling the movement of the cleaning spatula during cleaning operation is provided.

In one refinement of the invention, the outer tube and the device for cleaning the outer circumference of the outer tube are arranged below a common protective hood.

Consequently, no additional apertures or lead-throughs in the protective hood are necessary for the cleaning device.

In a method according to the invention, provision is made for the movement of the cleaning spatula, bearing on the outer circumference of the outer tube, parallel to the central longitudinal axis along the outer circumference, with simultaneous rotation of the outer drum, during a cleaning operation.

In this way, during a linear movement of the cleaning spatula, the complete outer circumference of the outer tube can be cleaned quickly and reliably. The cleaning spatula then covers a helical path on the outer tube, by which, with corresponding matching of the speed of the cleaning spatula and the circumferential speed of the outer circumference, the complete surface of the outer circumference can be covered.

In one refinement of the invention, provision is made for the movement of the cleaning spatula, bearing on the outer circumference of the outer tube, in a first direction of movement over the entire length of a region of the outer tube which is provided with passage openings, and then the lifting-off of the cleaning spatula from the outer circumference of the outer tube and subsequently the movement of the cleaning spatula in the lifted-off state in a second direction, which is opposite the first direction of movement.

Good cleaning action of the cleaning spatula is achieved only during the movement in the first direction of movement since the cleaning spatula is then arranged obliquely with respect to the central longitudinal axis of the outer tube and also obliquely against the direction of movement of the outer tube. By contrast, during the reverse movement, the cleaning spatula is lifted off from the outer circumference since, in this direction of movement, it would no longer be possible to achieve such good cleaning action and also it is intended to keep the mechanical loading of the surface of the outer circumference of the outer drum low.

In one refinement of the invention, the spraying of the outer circumference of the outer tube by means of the spray nozzles with a cleaning liquid during cleaning operation is provided.

In this way, it is possible for product residues on the outer drum to be partially dissolved, softened or else liquefied, in order to achieve reliable and thorough cleaning. Advantageously, the spray nozzles are arranged in the region of the cleaning spatula, and are moved together with these in order to apply the cleaning liquid in a precisely accurate manner and, for example, directly in front of the cleaning spatula on the outer circumference of the outer drum.

Figure 2:
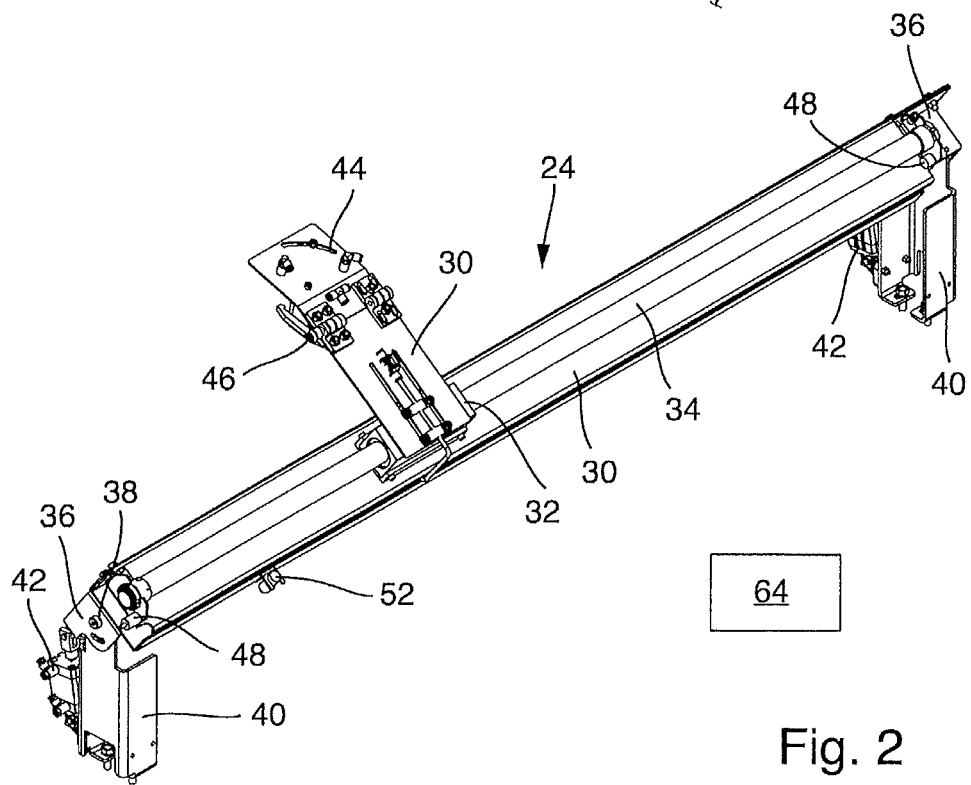
Figure 3:
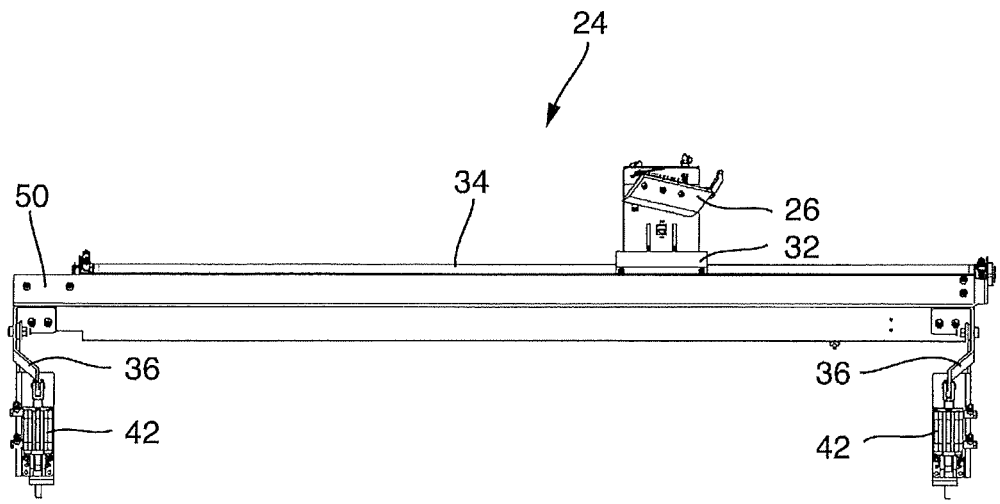
Figure 4:
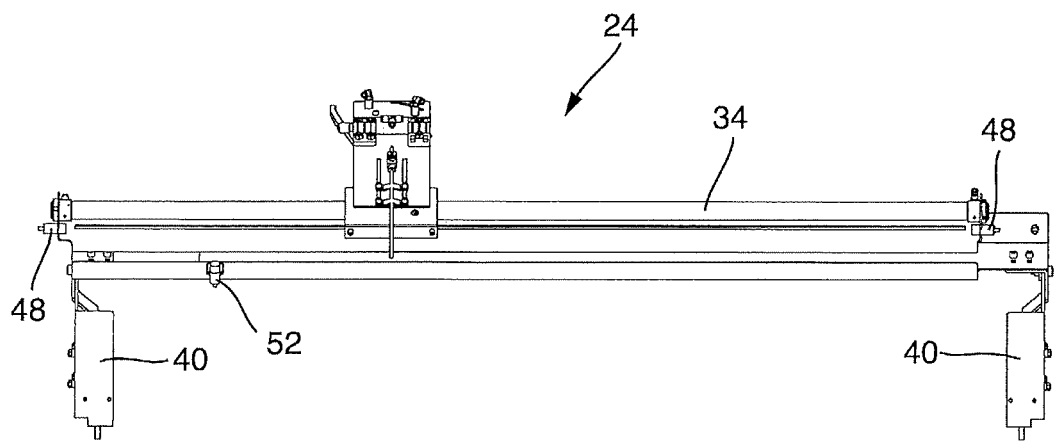
Figure 5:
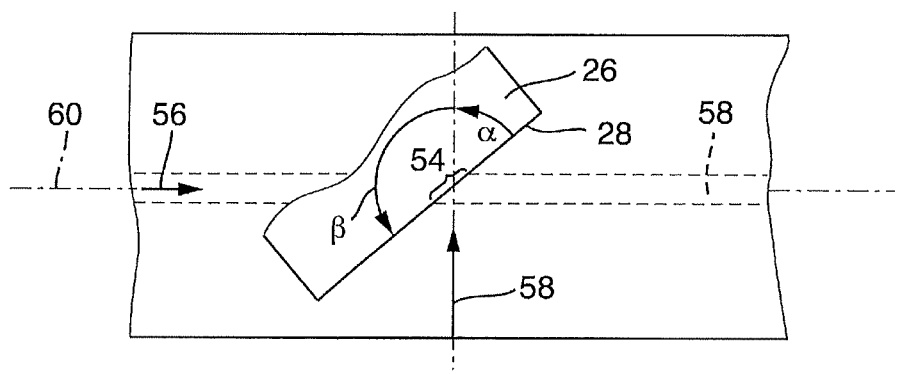
Figure 6:
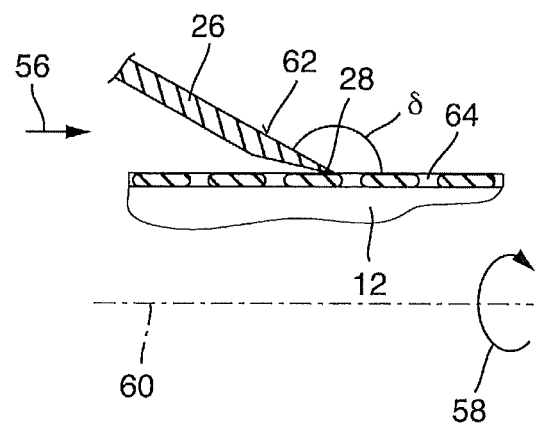

Further features and advantages of the invention will emerge from the claims and the following description of preferred embodiments of the invention in conjunction with the drawings. In the drawings:

FIG. 1 shows a schematic side view of a portion of an apparatus according to the invention, FIG. 2 shows the device for cleaning from FIG. 1 in a view obliquely from above, FIG. 3 shows the device in FIG. 2 in a view from the front, FIG. 4 shows the device in FIG. 2 in a view from the rear, FIG. 5 shows a schematic view of a portion of the apparatus in FIG. 1 from above, and FIG. 6 shows a schematic sectional view of a portion of the apparatus in FIG. 1

FIG. 1 shows, in a side view, an apparatus 10 for dropletizing a flowable product. The apparatus has a merely schematically illustrated outer tube 12, which is arranged in a rotatable manner on a core 14 and is provided with multiple passage openings which are distributed uniformly over the outer circumference of the outer tube 12. A product to be dropletized is fed via a feed device 16 in the core 14 and is conducted to a distribution apparatus 18, a so-called nozzle strip, which bears against the inner circumference of the outer tube 12. The flowable product is pressed through the passage openings in the outer tube 12 by the distribution apparatus 18 and is deposited in droplet form on a circulating steel belt 20. The steel belt circulates via two drums 22, of which a portion of merely one is illustrated in FIG. 1.

In FIG. 1, the outer tube rotates counterclockwise, and the steel belt 20 moves in the direction of the arrow 24. Below the outer tube 12, product droplets deposited on the steel belt 20 are consequently carried away to the left in the illustration in FIG. 1. The product droplets solidify while being transported on the steel belt 20 and are then able to be removed in solid form from the steel belt in a known manner.

In the case of certain products to be dropletized, it may be necessary for the outer circumference of the outer tube 12 to be cleaned permanently or from time to time, such that no product residues adhering to the outer circumference are present, which residues can adversely influence the quality of the pastilles produced.

For the purpose of allowing the outer circumference of the outer tube 12 to be cleaned, a device 24 for cleaning the outer circumference of the outer tube 12 is provided. The device 24 has a cleaning spatula 26, which consists of rubber-elastic material and is arranged obliquely against the direction of movement of the outer tube 12. It can be seen in FIG. 1 that a front edge 28 of the cleaning spatula 26 is formed by a top side of the plate-shaped cleaning spatula and a bevelled surface which is arranged on the bottom side. The bevelled surface on the bottom side of the cleaning spatula 26 makes it possible for the latter to be arranged in a highly flat manner and at a small angle to the outer circumference of the outer tube 12. The oblique arrangement of the front edge against the direction of movement of the outer tube 12 prevents the cleaning spatula from being drawn along by the rotating outer tube 12 and causes product residues on the outer circumference of the outer tube 12 to be lifted off by the cleaning spatula 26.

Here, the cleaning spatula 26 is, as can be seen in FIG. 1 and as has already been stated, arranged obliquely with respect to the outer circumference of the outer tube 12. The arrangement is realized such that, in the state of placement on the outer circumference, on a side which is situated at the front in a direction of movement of the cleaning spatula, a surface of the cleaning spatula which adjoins the front edge 28 of the cleaning spatula, that is to say the concealed top side of the cleaning spatula 26 in FIG. 1, and the outer circumference of the outer tube include an angle of greater than 90', in particular greater than 135°. In this way, product residues are able to be lifted off from the outer circumference of the outer tube 12 by the cleaning spatula 26.

Furthermore, the cleaning spatula is arranged obliquely with respect to the direction of movement of the outer tube such that, in the state of placement on the outer circumference and when the outer tube rotates during cleaning operation, the front edge 28 of the cleaning spatula is arranged obliquely against the direction of movement of the outer tube in the contact region between the cleaning spatula and the outer circumference of the outer tube. As seen from above and as measured counterclockwise (see FIG. 5), a portion of the front edge 28 which is situated in front of the center of the contact region in a direction of movement of the cleaning spatula then includes with the direction of movement of the outer tube a smaller angle than a portion of the front edge which is situated behind the center of the contact region in a direction of movement. For example, the front edge 28 of the cleaning spatula 26 includes an angle of 45° with the direction of movement of the outer tube 12. In front of the center of the contact region, there is then an angle of 45° between the front edge 28 and the direction of movement of the outer tube, whereas, behind the center of the contact region, there is an angle of 135° between the direction of movement of the outer tube and the front edge 28. In this way, the front edge 28 is thus arranged obliquely with respect to the direction of movement of the outer tube and at the same time against the direction of movement of the outer tube 12.

The cleaning spatula 26 is arranged on a holding strut 30 which is arranged on a carriage 32 of a linear guide. Specifically, the carriage 32 is arranged so as to be displaceable on a guide rod 34. The linear guide is in this case designed in the form of a pneumatic linear drive.

The guide rod 34 is in turn (see also FIG. 2) arranged on two pivot levers 36, of which merely one can be seen in FIG. 1. The pivot levers 36 are designed in the form of two-sided levers and are connected to a fixedly arranged machine frame 40 approximately centrally via a pivot axis 38. The two pivot levers 36 are rigidly connected to one another by means of a crossmember 50. That end of each pivot lever 36 which is opposite the end with the guide rod 34 is articulately connected to a pneumatic cylinder 42, the latter being connected on its opposite side to the machine frame 40. The pivot levers 36 are thus able to be pivoted about the pivot axis 38 by means of the pneumatic cylinders 42. Specifically, proceeding from the position illustrated in FIG. 1, in which the front edge 28 of the cleaning spatula 26 bears on the outer circumference of the outer tube 12, the pivot levers 36 can be pivoted into a second position, in which the cleaning spatula 26 is lifted off from the outer tube 12. For this purpose, the pneumatic cylinders 42 move upward that end of the pivot levers 36 which is assigned thereto. Consequently, the cleaning spatula 26 then moves clockwise away from the outer circumference of the outer tube 12.

By means of the linear drive, the carriage 32 can be moved along the guide rod 34, that is to say into the plane of the drawing and in an opposite manner in FIG. 1. Such a movement of the carriage 32 serves for moving the cleaning spatula 26 parallel to the central longitudinal axis 60 of the outer tube 12. Furthermore, the cleaning spatula 26 can be lifted off from the outer circumference of the outer tube 12 via the pneumatic cylinders 42.

During a cleaning operation, the cleaning spatula 26 is moved to a first end of the outer drum 12, which end is situated on the side of the observer in FIG. 1. In this position, the cleaning spatula 26 is then moved by means of the pneumatic cylinders 42 into the position illustrated in FIG. 1, thus resulting in the front edge 28 of the cleaning spatula 26 bearing on the outer circumference of the outer tube 12. Afterwards, the carriage 32 is moved relative to the guide rod 34, into the plane of the drawing in FIG. 1, while the outer tube 12, as illustrated in FIG. 1, rotates counterclockwise. A speed of movement of the carriage 32 along the guide rod is in this case matched to the rotational speed of the outer tube such that, by means of the cleaning spatula 26, it is possible to clean the complete outer circumference of the outer tube 12, or at least that region of the outer circumference which is provided with passage openings for the generation of product droplets.

As soon as the cleaning spatula 26 is arranged at that end of the outer tube 12 which faces away from the observer in FIG. 1, the pneumatic cylinders 42 are actuated and the cleaning spatula 26 is lifted off from the outer tube 12. In the lifted-off state, the cleaning spatula 26 is then moved, via a relative movement of the carriage 32 with respect to the guide rod 34, back into the starting position, in which the guide carriage 32 and the cleaning spatula 26 are thus arranged at that end of the guide rod 34 or the outer tube 12 which faces the observer in FIG. 1. A further cleaning process is then introduced in that the cleaning spatula 26 is placed, via actuation of the pneumatic cylinders, onto the outer circumference of the outer tube 12 again and then the carriage 32 is moved along the guide tube 34 again.

In FIG. 1, spray nozzles 42 can be seen at the holding means 30 in the region of the cleaning spatula 26. The spray nozzles 42 are provided for spraying cleaning liquid onto the outer circumference of the outer tube 12. The spray nozzles 42 are arranged such that they spray the cleaning liquid onto a region of the outer tube 12 which is situated in front of the front edge 28 of the cleaning spatula 26 with respect to a direction of movement of the cleaning spatula 26 during the cleaning operation, that is to say in the state illustrated in FIG. 1, in which the front edge 28 bears against the outer tube 12. For the sake of clarity, supply lines for the cleaning liquid to the nozzles 42 are indicated merely schematically in FIG. 1.

The cleaning spatula 26 consists of a rubber-elastic material, in particular Vulkollan, with the result that good cleaning action, with simultaneously low mechanical loading, with respect to any coating on the outer circumference of the outer tube 12 is achieved.

The illustration in FIG. 2 shows, obliquely from above, the device 24 for cleaning. In FIG. 2, the carriage 32 is illustrated in a position between the end on the left in FIG. 2 and the right-hand end of the guide rod 34. The plate-shaped formation of the holding means 30, which is fastened to the carriage 32 on one side and at whose other, free end the cleaning spatula (not able to be seen in FIG. 2) is arranged (cf. FIG. 1), can be seen. That portion of the holding means 30 to which the cleaning spatula 26 is fastened may in this case be folded down via clamping hinges 46 with respect to that portion of the holding means 30 which is connected to the carriage 32. In this way, the cleaning spatula 26 is easily accessible for maintenance work or replacement. A curved slot 44 in that portion of the holding means 30 in which the cleaning spatula 26 is fastened can be seen in FIG. 2. Extending through the curved slot 44 is a clamping screw, via which it is possible to set an angle of the cleaning spatula 26 to the central longitudinal axis 60 of the outer tube 12, that is to say also to the central longitudinal axis of the guide rod 34 in FIG. 2.

The clamping hinges 46 are provided to pivot that portion of the holding means 30 to which the cleaning spatula 26 is fastened and then to be able to lock said portion in the desired pivoting position. In this way, it is also possible to set an angle at which the cleaning spatula 26 is arranged with respect to the outer circumference of the outer tube 12.

In the region of the left-hand and right-hand ends of the guide rod 34, a proximity switch 48 can in each case be seen. An approach of the carriage 32 is detected by means of said proximity switch 48. In this way, the lifting-off or placement of the cleaning spatula 26 from/onto the outer circumference of the outer tube 12 in the predefined end positions can be brought about. Yet a further proximity switch 52 can be seen in FIG. 2 (see also FIG. 1), which generates a signal when the carriage 32 approaches that end of the guide rod 34 which is on the left in FIG. 2.

In the illustration in FIG. 2, it can also be seen that the machine frame 40 has two supports which are spaced apart from one another, and that a pneumatic cylinder 42 is fastened to each of these supports. The guide rod is in turn fastened to the crossmember 50, which supports the two ends of the guide rod 34 on the one hand and which connects the two pivot levers 36 to one another on the other hand, said pivot levers, as has been stated, being connected to the two supports of the machine frame 40 so as to be pivotable about the pivot axis 38.

It is possible by means of the apparatus 10 in FIG. 1, which is provided with the device for cleaning 24, to realize automatic cleaning of the outer tube 12, for example by the pressing of a button or automatically at regular time intervals. Such automatic cleaning, corresponding to a cleaning operation which takes place regularly, is particularly advantageous in the case of the dropletization of products such as urea, ammonium nitrate or other various fertilizers. For example, it is possible by means of the device 24, and specifically the cleaning spatula 26, for product residues which have crystallized out to be removed in a scratch-free and gentle manner from the outer circumference of the outer tube 12, which is coated for example.

Movement of the cleaning spatula 26 is realized by means of the pneumatic linear drive by means of the carriage 32 and the guide tube 34, and also by means of the two pneumatic cylinders 42. It is possible precisely in the case of explosive substances, such as for example ammonium nitrate, for the device 24 to be used safely in this way. It is in particular possible for the device 24 to be arranged together with the outer tube 12 below a common protective hood. Such a protective hood can provide a desired atmosphere, which prevents or at least delays the crystallization or else only drying of product residues on the outer tube 12.

As has already been described, the cleaning spatula 26 can, in combination with the pivot lever 36, be lifted off from the outer tube 12 and thus folded down. In the folded-down state, the cleaning spatula 26 is then easily accessible for cleaning or maintenance work. The cleaning is further facilitated by the clamping hinges 46. That section of the holding means 30 which has the cleaning spatula 26 can thus be folded over such that the cleaning spatula 26 is very easily accessible for replacement.

The device 24 for cleaning can, without any problems, be retrofitted to existing apparatuses for dropletizing flowable products.

The illustration in FIG. 3 shows a front view of the device 24 in FIG. 2. The cleaning spatula 26 and also the arrangement of the guide rod 34 with the carriage 32 and the formation of the support 50 can be seen. The pivot arms 36 are of cranked form in order for the pneumatic cylinders 42 at the left-hand and right-hand ends of the support 50 not to be able to project therebeyond.

FIG. 4 shows, from the rear, a view of the device 24 in FIG. 2. In this view, the formation of the supports of the machine frame 40 can be seen, and also the guide rod 34 is illustrated with good clarity.

As soon as a cleaning operation is requested or automatically triggered, either the cleaning spatula 26 is moved into the end position situated on the left in FIG. 2 or said spatula is, at the beginning of the cleaning operation, already in said end position arranged on the left. As has already been discussed, it can be determined by means of the proximity switch 48 when this end position is reached or assumed.

Proceeding from this left-hand end position, the carriage 32 in FIG. 2 is moved to the right along the guide rod 34 until a defined intermediate position of the carriage 32 is detected by means of the sensor 52. During the movement from the left-hand end position up to the intermediate position, which is detected by the sensor 52, the cleaning spatula 26 is still in the lifted-off state with respect to the outer tube 12. The intermediate position corresponds to the left-hand end of the outer tube or to the beginning of that region of the outer tube which is provided with passage openings for the dropletization of a flowable product. It is indeed intended that that region of the outer tube 12 which is provided with the passage openings is cleaned by means of the cleaning spatula 26.

In said intermediate position, which is detected by the sensor 52, the carriage 32 stops. The standstill duration may then be several seconds. In said intermediate position, the pneumatic cylinders 42 are then activated and the cleaning spatula 26 is, via pivoting of the pivot levers 36, brought into the position illustrated in FIG. 1, in which the front edge 28 of the cleaning spatula 26 bears on the outer circumference of the outer tube 12. During this process, the outer tube 12 rotates in the direction indicated in FIG. 1. In combination with this folding process of the cleaning spatula 26, a solenoid valve is opened and cleaning liquid, in particular water, flows to the spray nozzles 42, with the result that the outer circumference of the outer tube 12 is sprayed with the cleaning liquid in the region in front of the front edge 28 of the cleaning spatula 26.

The actual cleaning process then begins in that the carriage 32 in FIG. 2 is moved along the guide rod 34 to the right. As has been stated, the front edge 28 of the cleaning spatula 26 bears on the outer circumference of the outer tube 12 during this movement along the guide rod 34, and the outer tube 12 rotates at the same time. The speed of movement of the carriage 32 is in this case matched to the rotational speed of the outer tube 12 such that the front edge 28 of the cleaning spatula 26 passes over the complete outer circumference of the outer tube 12, which is provided with passage openings, and lifts off any product residues adhering there. Here, the cleaning liquid applied by way of the spray nozzles 42 assists the cleaning process.

During this cleaning, the carriage 32 is moved uniformly and at constant speed up to that end of the guide rod 34 which is on the right in FIG. 2. When the carriage 32 is situated in the right-hand end position, this is detected by the proximity sensor 48 at the right-hand end of the device 24. As soon as the carriage 32 has arrived in the right-hand end position, the pneumatic cylinders 42 are activated again and the cleaning spatula 26 is lifted off from the outer tube 12 by pivoting of the pivot levers 36 about the pivot axis 38. In this lifted-off position of the cleaning spatula 26, the carriage 32 is then moved, to the left in FIG. 2, back into the left-hand end position, this being detected by the proximity sensor 48 which is arranged at the left-hand end. The carriage 32 and the cleaning spatula 26 are then situated in the starting position again for the beginning of a further cleaning process or cleaning operation. The solenoid valve for the feeding of the cleaning liquid to the spray nozzles 42 is advantageously closed already after the right-hand end position of the carriage 32 is reached, that is to say when the actual cleaning process, during which the cleaning spatula 26 bears on the outer tube 12 and is moved along the outer tube, has been completed.

It goes without saying that the device 24 may also be constructed in an opposite manner, that is to say that the beginning of the cleaning operation is realized at the right-hand end, and a direction of movement of the cleaning spatula, bearing on the outer tube 12, is realized from right to left. According to the invention, it is however also necessary in such a case for the cleaning spatula 26 to be arranged such that, during its movement parallel to the outer tube, said cleaning spatula, in the manner of a spatula, lifts product residues off from the outer circumference of the outer tube 12 and at the same time is arranged obliquely with respect to the direction of movement of the outer circumference.

The illustration in FIG. 5 shows a schematic illustration for showing more clearly the oblique arrangement of the front edge 28 of the cleaning spatula 26 (cf. FIG. 1). A portion of the cleaning spatula 26 is illustrated, and the front edge 28 thereof, which, owing to its elasticity, bears on the outer circumference of the outer tube 12 via a contact region 54, is moved in a direction of movement 56 parallel to the central longitudinal axis of the outer tube 12. The direction of movement 56 is predefined by the longitudinal direction of the guide rod 34. The front edge 28 consequently passes over a region 58, indicated by dashed lines in FIG. 5, of the outer circumference of the outer tube. During the movement of the cleaning spatula 26 in the direction of movement 56, the outer tube 12 rotates (see FIG. 1). The direction of movement 58 of the outer circumference of the outer tube 12 is indicated in FIG. 5 by means of the arrow 58. The contact region 54 of the front edge 28 of the cleaning spatula 26 consequently covers a helical path on the outer circumference of the outer tube 12. The pitch of said helical path is matched by the matching of the speed of the cleaning spatula 26 in the direction of movement 56 and the rotational speed of the outer tube 12 in the direction of movement 58, such that the helical path passes over the entire surface region of the outer circumference of the outer tube 12, which is provided with passage openings for the dropletization of a flowable product.

It can also be seen in FIG. 5 that the front edge 28 is arranged obliquely against the direction of movement 58 of the outer tube 12 in the region 54 such that a portion of the front edge 28 which is situated in front of the center of the region 54 in the direction of movement 56 of the cleaning spatula 26 includes with the direction of movement 58 an angle $\alpha$ which is less than an angle $\beta$, which the direction of movement 58 includes with that portion of the front edge 28 which is situated behind the center of the region 54. Here, the outer tube 12 and the cleaning spatula 26 are being viewed from above, and the angle measurement is realized clockwise, beginning at that portion of the front edge 28 which is situated in front of the center of the contact region 54. If the front edge 28 is arranged, at an angle of 45°, obliquely with respect to the direction of movement 58 of the outer tube 12, then the angle between that portion of the front edge 28 which is situated in front of the region 54 in the direction of movement and the direction of movement 58 is 45°. By contrast, the angle between the direction of movement 58 and that portion of the front edge 28 which is situated behind the contact region 54 is 135°. Such an arrangement of the front edge 28 can ensure the spatula action of the cleaning spatula 26 and the lifting-off of the product residues, and the situation in which the outer tube 12 draws along the front edge 28 of the cleaning spatula 26 and product residues are then only distributed over a large area on the outer circumference of the outer tube 12 is also prevented.

FIG. 6 shows a schematic sectional view of a portion of the outer tube 12 and of the cleaning spatula 26. A central longitudinal axis 60 of the outer tube 12 is also drawn, and an indication is made that the outer tube 12 rotates about the central longitudinal axis 60 in the direction of the curved arrow 58. The cleaning spatula 26 is moved relative to the outer tube 12 along the arrow 56. The cleaning spatula 26 is also arranged obliquely with respect to the outer tube 12 in the side view, such that, on a side which is situated at the front in the direction of movement 56, a surface 62 which adjoins the front edge 28 of the cleaning spatula 26 includes an angle $\delta$ of greater than 90°, in particular greater than 135', with the outer circumference of the outer tube 12. In this way, it is possible by means of the cleaning spatula 26 for product residues to be reliably lifted off from the outer circumference of the outer tube 12, the latter being provided with passage openings 64.

The invention claimed is:

1. An apparatus for dropletizing a flowable product, having an outer tube which is arranged in a rotatable manner on a core and which is provided with multiple passage openings, wherein, in the core, a feed device for the product to be dropletized and a distribution apparatus bearing against the inner circumference of the outer tube are provided, wherein a device for cleaning an outer circumference of the outer tube is provided, wherein the device has a cleaning spatula, a guide rail for the cleaning spatula, which guide rail extends parallel to a central longitudinal axis of the outer tube, and first drive means for moving the cleaning spatula along the guide rail.

2. The apparatus as claimed in claim 1, including second drive means for placing the cleaning spatula onto the outer circumference, and for lifting the cleaning spatula off of the outer circumference, of the outer tube.

3. The apparatus as claimed in claim 1, wherein the cleaning spatula is arranged such that, in a state of placement on the outer circumference, on a side which is situated at a front in a direction of movement of the cleaning spatula, a surface of the cleaning spatula which adjoins a front edge of the cleaning spatula and the outer circumference of the outer tube include an angle of greater than 90 degrees.

4. The apparatus as claimed in claim 3, wherein the cleaning spatula is arranged such that, in the state of placement on the outer circumference and when the outer tube rotates, the front edge of the cleaning spatula is arranged obliquely with respect to a direction of movement of the outer tube in a contact region between the cleaning spatula and the outer circumference of the outer tube, wherein a portion of the front edge which is situated in front of a center of the contact region in the direction of movement of the cleaning spatula includes with the direction of movement of the outer tube a smaller angle than a portion of the front edge which is situated behind the center of the contact region in the direction of movement of the cleaning spatula.

5. The apparatus as claimed in claim 1, wherein the cleaning spatula is formed from a rubber-elastic material.

6. The apparatus as claimed in claim 1, further including at least one spray nozzle for spraying the outer circumference of the outer tube with a cleaning liquid.

7. The apparatus as claimed in claim 6, wherein the at least one spray nozzle is arranged in a region of the cleaning spatula and is moved together with the cleaning spatula.

8. The apparatus as claimed in claim 1, wherein the first drive means comprises a pneumatic linear drive.

9. The apparatus as claimed in claim 2, wherein the second drive means comprises at least one pneumatic cylinder.

10. The apparatus as claimed in claim 1, including position sensors on the guide rail for detecting at least end positions of the cleaning spatula.

11. The apparatus as claimed in claim 1, including a pneumatic-electronic control unit for controlling movement of the cleaning spatula during a cleaning operation.

12. The apparatus as claimed in claim 1, wherein the outer tube and the device for cleaning the outer circumference of the outer tube are arranged below a common protective hood.

13. A method for operating the apparatus as claimed in claim 1, including movement of the cleaning spatula, bearing on the outer circumference of the outer tube, parallel to the central longitudinal axis of the outer tube along the outer circumference, with simultaneous rotation of the outer tube, during a cleaning operation.

14. The method as claimed in claim 13, including movement of the cleaning spatula, bearing on the outer circumference of the outer tube, in a first direction of movement over an entire length of a region of the outer tube which is provided with passage openings, and then lifting-off the cleaning spatula from the outer circumference of the outer tube and movement of the cleaning spatula in a lifted-off state in a second direction, which is opposite the first direction of movement.

15. The method as claimed in claim 13, including spraying the outer circumference of the outer tube with a cleaning liquid via spray nozzles.

16. The apparatus as claimed in claim 3, wherein the angle is greater than 135 degrees.

17. The apparatus as claimed in claim 5, wherein the rubber-elastic material comprises polyester urethane rubber.

* * * * *